United States Patent
Kuno (10) Patent No.: US 7,543,888 B2
(45) Date of Patent: Jun. 9, 2009

(54) VEHICLE SEATS

(75) Inventor: Satoru Kuno, Aichi-ken (JP)

(73) Assignee: Toyota Boshoku Kabushiki Kaisha, Aichi-ken (JP)

(*) Notice: Subject to any disclaimer, the term of this patent is extended or adjusted under 35 U.S.C. 154(b) by 0 days.

(21) Appl. No.: 12/062,115

(22) Filed: Apr. 3, 2008

(65) Prior Publication Data
US 2008/0246323 A1 Oct. 9, 2008

(30) Foreign Application Priority Data
Apr. 6, 2007 (JP) ............... 2007-100608

(51) Int. Cl.
*B60N 2/02* (2006.01)
(52) U.S. Cl. .............. 297/353; 297/391; 297/396; 297/410
(58) Field of Classification Search ............. 297/391, 297/396, 410, 353
See application file for complete search history.

(56) References Cited

U.S. PATENT DOCUMENTS

| 4,923,250 | A | * | 5/1990 | Hattori | 297/410 |
| 5,171,062 | A | | 12/1992 | Courtois | |
| 5,695,245 | A | * | 12/1997 | Carlson et al. | 297/314 |
| 5,836,647 | A | * | 11/1998 | Turman | 297/216.1 |
| 5,836,651 | A | * | 11/1998 | Szerdahelyi et al. | 297/410 |
| 6,447,062 | B1 | * | 9/2002 | Jaekel et al. | 297/284.7 |
| 6,530,622 | B1 | * | 3/2003 | Ekern et al. | 297/284.4 |
| 6,601,918 | B2 | | 8/2003 | Mattsson | |
| 7,097,246 | B2 | * | 8/2006 | Sedlatschek et al. | 297/284.3 |
| 7,232,187 | B1 | * | 6/2007 | Sundararajan et al. | 297/410 |
| 7,246,852 | B2 | * | 7/2007 | Balensiefer | 297/250.1 |
| 7,370,912 | B2 | * | 5/2008 | Williams et al. | 297/256.11 |

FOREIGN PATENT DOCUMENTS

| DE | 4219941 A1 | * | 12/1993 |
| JP | 10-086720 | | 4/1998 |
| JP | 2000-25498 | | 1/2000 |
| JP | 2001-95645 | | 4/2001 |

OTHER PUBLICATIONS

English language Abstract of JP 2001-95645.
English language Abstract of JP 2000-25498.
English language Abstract of JP 10-086720.
U.S. Appl. No. 12/062,086 to Yusuke Nishikawa et al, which was filed Apr. 3, 2008.

* cited by examiner

*Primary Examiner*—Laurie K Cranmer
(74) *Attorney, Agent, or Firm*—Greenblum & Bernstein, P.L.C.

(57) ABSTRACT

A vehicle seat can include a seat back and a head rest. The seat back includes an upper half corresponding to a shoulder portion of a passenger, a lower half corresponding to a waist portion of the passenger, and an head rest height adjustment mechanism. The seat back upper half is connected to a structural component of the head rest or a movable component of the head rest height adjustment mechanism, so as to be vertically moved relative to the seat back lower half when the head rest height adjustment mechanism is actuated.

4 Claims, 6 Drawing Sheets

VEHICLE SEATS

This application claims priority to Japanese patent application serial number 2007-100608, the contents of which are incorporated herein by reference.

BACKGROUND OF THE INVENTION

The present invention relates to vehicle seats. More particularly, the present invention relates to vehicle seats each having a seat back and a head rest.

A vehicle seat having a head rest in which a vertical position of the head rest can be adjusted is already known. Such a vehicle seat is taught, for example, by Japanese Laid-Open Patent Publication Number 2001-95645.

In the known vehicle seat, an electronic drive unit is embedded in a seat back of the vehicle seat, so that the vertical position of the head rest can be electrically adjusted by manipulating a switch of the drive unit. In particular, head rest stays that are introduced into the seat back can be vertically moved when the switch of the drive unit is manipulated, so that the vertical position of the head rest can be electrically adjusted for body size of a user or passenger.

BRIEF SUMMARY OF THE INVENTION

However, the known vehicle seat still are in need of improvement.

In one aspect of the present invention, a vehicle seat may include a seat back and a head rest. The seat back includes an upper half corresponding to a shoulder portion of a passenger, a lower half corresponding to a waist portion of the passenger, and a head rest height adjustment mechanism. The seat back upper half is connected to a structural component of the head rest or a movable component of the head rest height adjustment mechanism, so as to be vertically moved relative to the seat back lower half when the head rest height adjustment mechanism is actuated.

According to this aspect, when the head rest is vertically moved, the upper half of the seat back can be dependently vertically moved relative to the lower half of the seat back. Therefore, the seat back can be precisely adjusted in order to fit the body size of the passenger.

In one embodiment, the head rest height adjustment mechanism may preferably be arranged and constructed such that the seat back upper half and the head rest can be vertically moved as a unit when the head rest height adjustment mechanism is actuated.

In another embodiment, the head rest height adjustment mechanism may preferably be arranged and constructed such that the seat back upper half can be vertically moved relative to the seat back lower half while the head rest is vertically moved relative to the seat back upper half.

Optionally, the seat back upper half is connected to the movable component of the head rest height adjustment mechanism via a reduction mechanism, so as to be vertically moved at a speed slower than the head rest.

Other objects, features and advantages of the present invention will be readily understood after reading the following detailed description together with the accompanying drawings and the claims.

DETAILED DESCRIPTION OF THE INVENTION

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Detailed representative embodiments of the present invention are shown in FIG. 1 to FIG. 6.

FIRST DETAILED REPRESENTATIVE EMBODIMENT

A first detailed representative embodiment of the present invention will be described with reference to FIGS. 1 to 4. However, before describing the first representative embodiment in detail, a summary of the representative embodiment will be provided.

Figure 1:
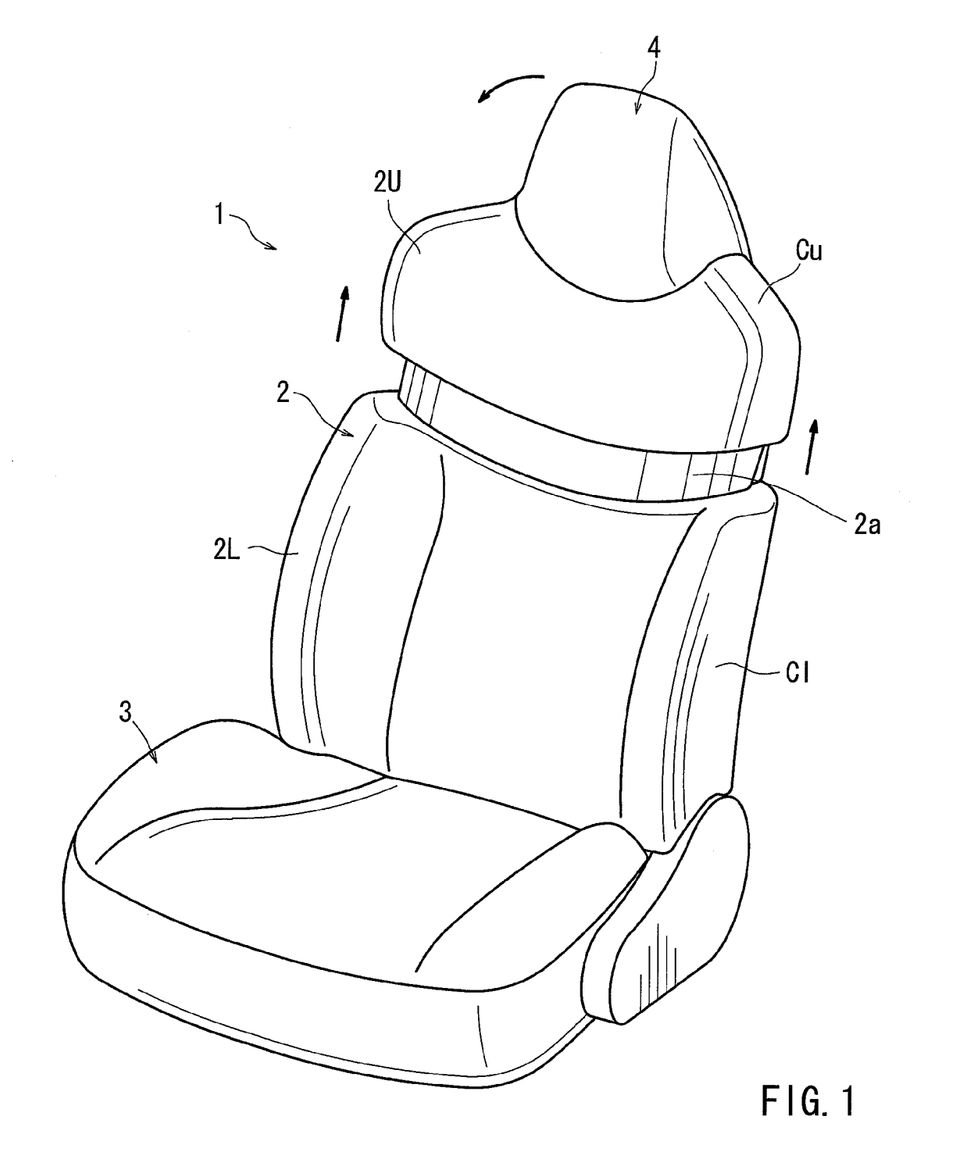
FIG. 1 is a perspective view of a vehicle seat according to a first representative embodiment of the present invention, which schematically illustrates motion of an upper half of a seat back.

As shown in FIG. 1, a representative vehicle seat 1 may preferably include a seat back 2 having a head rest 4 and a seat cushion 3. The seat back 2 is rotatably connected to the seat cushion 3 via a seat reclining device (not shown), so that a tilting angle of the seat back 2 relative to the seat cushion 3 can be adjusted by operating the seat reclining device (i.e., by switching the seat reclining device between a locked condition and an unlocked condition). As will be appreciated, the seat reclining device can be changed between the locked condition and the unlocked condition by simply operating an operation lever (not shown) that is attached to a side portion of the seat cushion 3.

As shown in FIG. 1, the seat back 2 is divided to an upper half 2U integrally having the head rest 4 and a lower half 2L, which respectively correspond to a shoulder portion (a head portion) and a waist portion of a passenger. Further, angular adjustment mechanisms are disposed between the upper half 2U and the lower half 2L, so as to change a forward and backward tilting angle of the upper half 2U relative to the lower half 2L. As shown by broken lines in FIG. 1, each of the angular adjustment mechanisms allows the seat back upper half 2U to tilt forwardly relative to the seat back lower half 2L, thereby intermediately folding the seat back 2 at an intermediate folding position. Therefore, the seat back upper half 2U can be, for example, tilted forwardly while the seat back lower half 2L is tilted rearwardly, so that the seat back 2 can be bent to a V-shape. In such a condition of the seat back 2, the passenger can look forward while keeping a comfortable sitting position in which abdominal regions of the passenger are not pressed.

Further, upper half height adjustment mechanisms are provided to the upper half 2U of the seat back 2, in order to vertically move the upper half 2U (the head rest 4) relative to the lower half 2L. As shown by solid lines in FIG. 1, each of the upper half height adjustment mechanisms allows the seat back upper half 2U (the head rest 4) to move upwardly relative to the lower half 2L, thereby extending an overall height or length of the seat back 2. Therefore, the overall length of the seat back 2 can be adjusted for body size of the passenger when the upper half 2U is raised by the upper half height adjustment mechanisms.

Further, the overall length of the seat back 2 can be extended by upwardly moving the seat back upper half 2U without raising or upwardly moving an intermediate folding position thereof. Therefore, if the upper half 2U is moved upwardly in order to extend the overall length of the seat back 2, the upper half 2U can be tilted forwardly relative to the seat back lower half 2L in large radius of rotation. As a result, the seat back 2 may widely be adjusted so as to conform to various sitting positions of the passenger based upon the body size thereof.

The seat back lower half 2L is shaped so as to have an upper reduced neck portion 2a. The neck portion 2a is telescopically coupled to the seat back upper half 2U, so as to be exposed when the upper half 2U is moved upwardly. Therefore, when the upper half 2U is moved upwardly relative to the lower half 2L, inner structure of the seat back 2 can be prevented from being exposed. As will be recognized, the upper half 2U and the lower half 2L are respectively covered with covering members Cu and Cl.

The first detailed representative embodiment will now described in detail.

Figure 2:
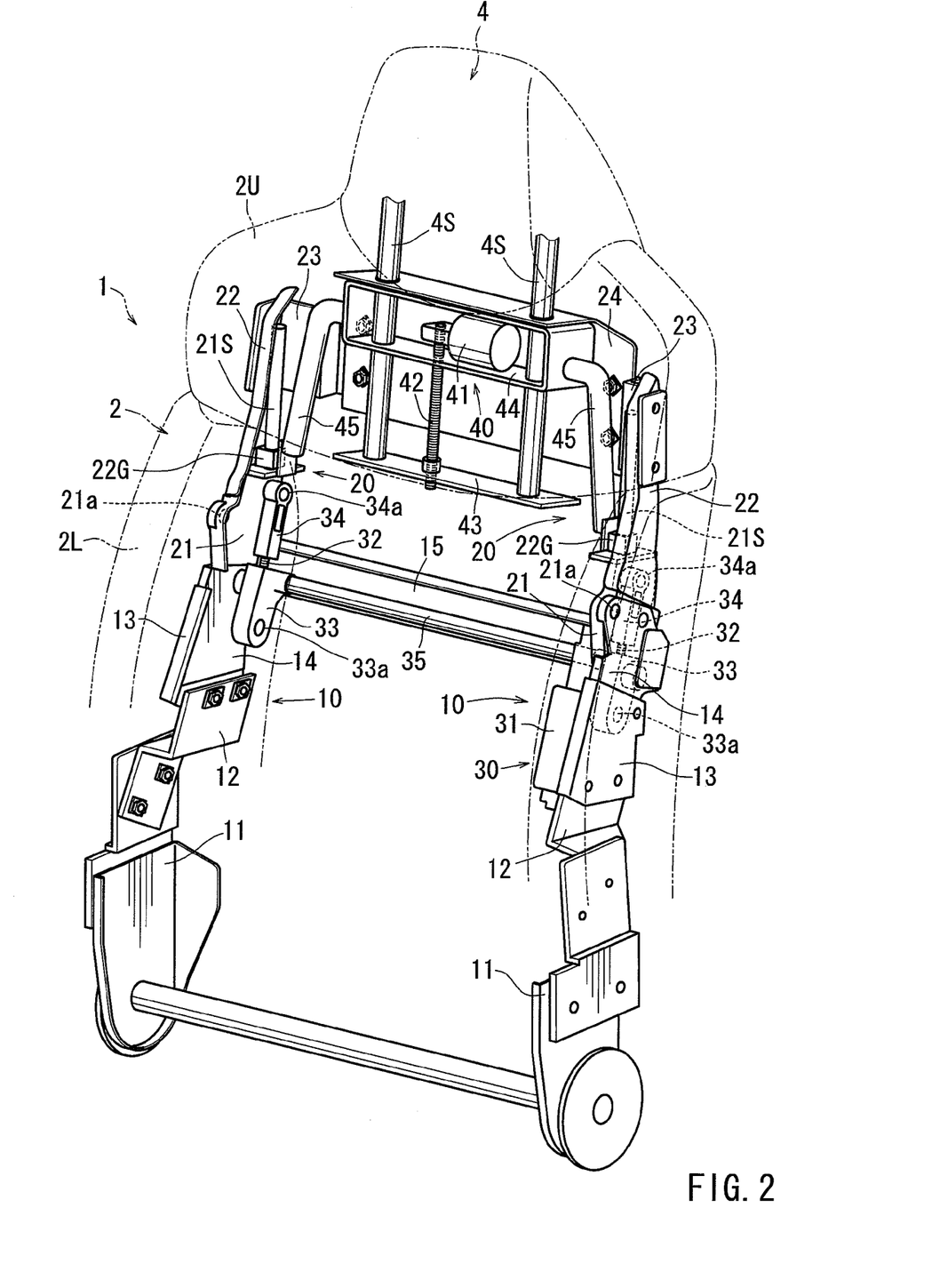
FIG. 2 is a perspective view of the vehicle seat, which illustrates a framework or inner structure thereof.

As shown in FIG. 2, the seat back 2 may preferably include a pair of steel upper frames (a pair of frame assemblies) 10 and a pair of steel lower frames (a pair of frame assemblies) 20 that respectively correspond to the seat back upper half 2U and the seat back lower half 2L. The upper and lower frames 10 and 20 are rotatably connected to each other via hinge connection, thereby forming each of the angular adjustment mechanisms that allows the upper half 2U to tilt back and forth relative to the lower half 2L. Thus, the seat back 2 can be intermediately folded via the angular adjustment mechanisms. Further, the hinge connection corresponds to the intermediate folding position of the seat back 2.

Each of the upper frames 20 is composed of a rotatable plate 21 and a liftable plate 22 that is capable of vertically moving relative to the rotatable plate 21. The rotatable plate 21 and the liftable plate 22 may constitute a substantial portion of each of the upper half height adjustment mechanisms that allows the upper half 2U to vertically move relative to the lower half 2L. Thus, upon upward movement of the liftable plates 22 of the upper frames 20, the upper half 2U is moved upwardly relative to the lower half 2L, so that the overall length of the seat back 2 can be extended.

Figure 4:
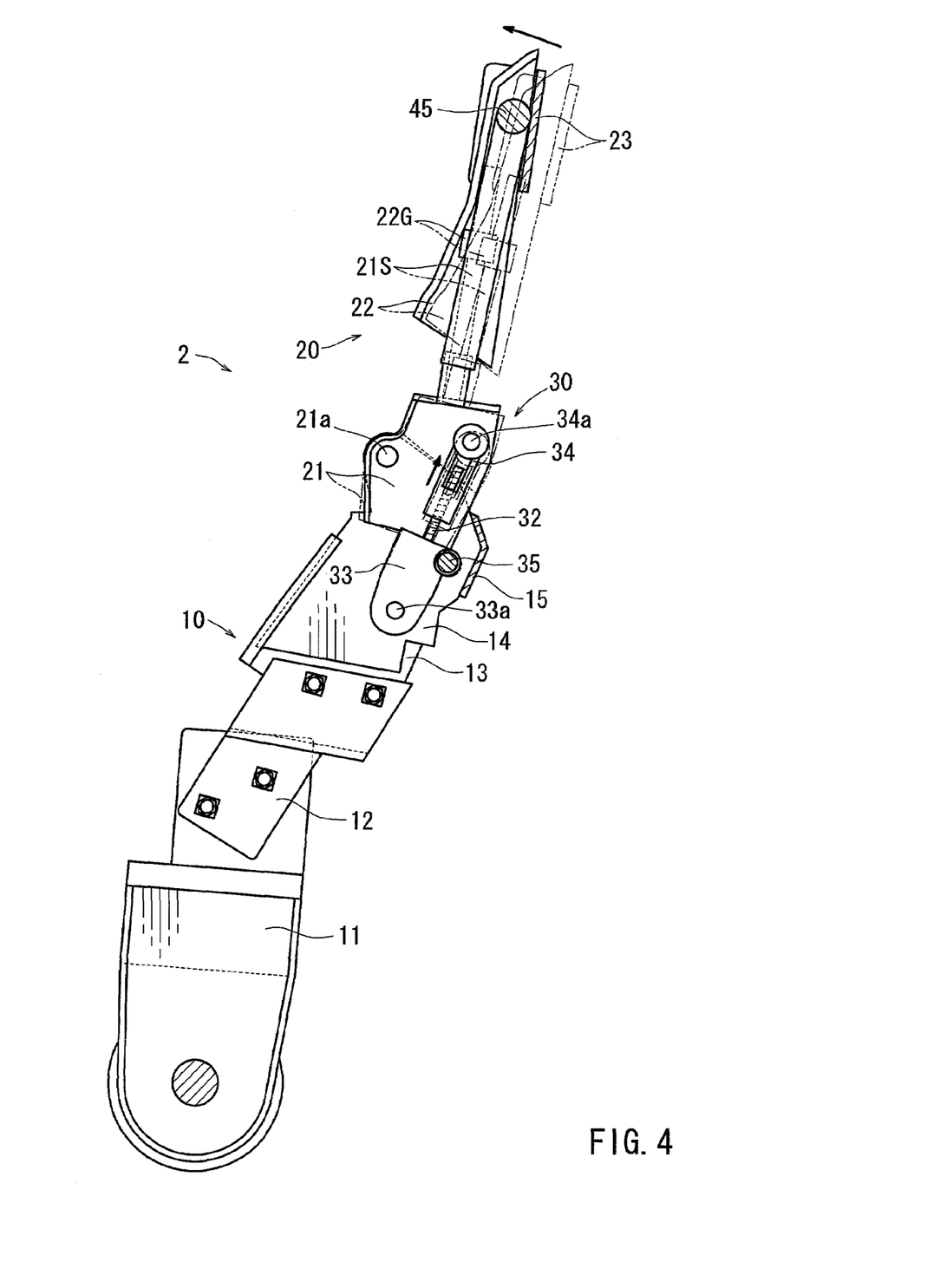
FIG. 4 is a cross-sectional view taken along line IV-IV in FIG. 3, which illustrates motion of the seat back upper half for intermediately folding the seat back.

Conversely, each of the lower frames 10 is composed of a base plate 11, a shouldered bracket plate 12, an intermediate plate 13 and a support plate 14. These plates 11, 12, 13 and 14 are positioned in series in this order from the bottom and are rigidly integrally connected to each other. Further, as shown in FIG. 4, the support plates 14 of the lower frames 10 are transversely rigidly connected to each other via a lateral reinforcement plate 15. Thus, the lower frames 10 are rigidly integrated with each other, thereby forming a U-shaped frame body having increased torsional stiffness.

The rotatable plates 21 of the upper frames 20 are respectively rotatably or pivotally connected (hinge connected) to the support plates 14 of the lower frames 10 via hinge pins 21a. As will be appreciated, connection of the rotatable plate 21 and the support plate 14 via the hinge pins 21a corresponds to the hinge connection of the upper and lower frames 10 and 20 described above. Further, the rotatable plates 21 are respectively connected to the liftable plates 22 via a guide mechanism, so that the liftable plates 22 are capable of moving vertically (i.e., in a lengthwise direction of the seat back 2) relative to the rotatable plates 21. As shown in, for example, FIG. 3, the guide mechanism is composed of vertical guide rods 21S that are respectively vertically positioned and being fixedly connected to the rotatable plates 21, and slide blocks 22G that are respectively connected to the liftable plates 22 and being slidably coupled to the guide rods 21S. Thus, the liftable plates 22 are capable of vertically moving relative to the rotatable plates 21 along the guide rods 21S. In addition, the liftable plates 22 are transversely rigidly connected to each other via a lateral reinforcement plate 24 and two shouldered bracket plates 23 that are attached to both ends thereof. Therefore, the upper frames 20 are rigidly integrated with each other, thereby forming a U-shaped frame body having increased torsional stiffness. Also, the upper frames 20 thus assembled are capable of integrally moving vertically in synchronism with each other.

An upper half tilting device 30 is disposed between the seat back upper and lower halves 2U and 2L. The upper half tilting device 30 is arranged and constructed to tilt the upper half 2U relative to the lower half 2L. The upper half tilting device 30 is composed of a drive motor 31, a pair of screw rods 32, a pair of guide members 33, a pair of operation members 34 and a lateral coupling shaft 35.

The guide members 33 are respectively rotatably attached to the support plates 14 (the lower frames 10) via pins 33a, so as to rotate forward and backward thereabout. The screw rods 32 are respectively rotatably coupled to the guide members 33. In particular, lower portions of the screw rods 32 are respectively embedded in the guide members 33 such that upper portions of the screw rods 32 extend vertically upwardly therefrom. The screw rods 32 thus arranged are threadably coupled to each other via the lateral coupling shaft 35, so as to rotate in synchronism with each other. The drive motor 31 may preferably be attached to one of the guide members 33 (the right guide member 33 as seen in the drawings), so as to rotate the corresponding screw rod 32. As a result, the drive motor 31 is capable of rotating with the right guide member 33 with respect to the support plates 14 (the lower frames 10) via the pins 33a. Further, the drive motor 31 is electrically connected to a switch (not shown) that is attached to an appropriate portion of the vehicle seat 1. As will be appreciated, the switch may preferably be constructed to turn on and off the drive motor 31 or to change rotation of direction (normal or reverse direction) of the drive motor 31.

The operation members 34 respectively threadably engage the upwardly extended upper portions of the screw rods 32. Also, upper portions of the operation members 34 are respectively rotatably attached to the rotatable plates 21 (the upper frames 20) via pins 34a, so as to rotate forward and backward thereabout. Therefore, the operation members 34 are respectively capable of vertically moving along the screw rods 32 when the screw rods 32 are rotated by the drive motor 31. As will be appreciated, the screw rods 32 and the operation members 34 are respectively threaded such that the operation members 34 can respectively move in the same direction along the screw rods 32 when the screw rods 32 are rotated by the drive motor 31.

As shown by solid lines in FIG. 4, when the operation members 34 move upwardly along the screw rods 32 upon rotation of the screw rods 32, the rotatable plates 21 (the upper frames 20) are respectively pushed upwardly via the pins 34a, so as to be rotated forwardly about the hinge pins 21a. As a result, the seat back upper half 2U is rotated forwardly relative to the seat back lower half 2L, so that the seat back 2 can be intermediately folded. Conversely, when the operation members 34 move downwardly along the screw rods 32 upon reverse rotation of the screw rods 32, the rotatable plates 21 (the upper frames 20) are respectively pulled downwardly via the pins 34a, so as to be rotated rearwardly about the hinge pins 21a. As a result, the upper half 2U is rotated rearwardly relative to the lower half 2L, so that the seat back 2 can be intermediately unfolded.

Further, because the guide members 33 and the operation members 34 are respectively rotatably attached to the support plates 14 and the rotatable plates 21 via the pins 33a and the pins 34a, the rotatable plates 21 can be smoothly rotated forwardly and rearwardly about the hinge pins 21a. As a result, the upper half 2U can be smoothly rotated forwardly and rearwardly relative to the lower half 2L.

A head rest height adjustment mechanism is provided to the upper half 2U. The head rest height adjustment mechanism may preferably include a vertically moving device 40 that constitutes the substantial portion thereof. The vertically moving device 40 is arranged and constructed to vertically move the upper half 2U (the head rest 4) relative to the lower half 2L. As shown in FIG. 2, the vertically moving device 40 is composed of a drive motor 41, a screw rod 42, a plate-shaped stay lifting base (a movable component) 43, a frame-shaped main body 44 and a pair of support members 45.

The main body 44 is integrally fixedly connected to the rotatable plates 21 of the upper frame 20 via the support members 45. The main body 44 may preferably be constructed such that the drive motor 41 and the screw rod 42 can be attached thereto. The drive motor 41 is disposed on the main body 44. Further, the drive motor 41 is electrically connected to a switch (not shown) that is attached to an appropriate portion of the vehicle seat 1. As will be appreciated, the switch may preferably be constructed to turn on and off the drive motor 41 or to change rotation of direction (normal or reverse direction) of the drive motor 41.

The screw rod 42 is vertically positioned and is rotatably attached to the main body 44. An upper end of the screw rod 42 is connected to the drive motor 41, so that the screw rod 42 can be rotated when the drive motor 41 is actuated. The screw rod 42 is extended downwardly and is threadably coupled to the stay lifting base 43 that is positioned below the main body 44. The stay lifting base 43 is connected to a pair of head rest stays (head rest structural components) 4S. The head rest stays 4S are respectively vertically positioned and vertically slidably penetrate the main body 44. Therefore, the head rest stays 4S are capable of vertically moving relative to the main body 44.

Therefore, upon actuation of the drive motor 41, the screw rod 42 is rotated, so that the stay lifting base 43 is vertically moved along the screw rod 42. As a result, the head rest stays 4S can be vertically moved relative to the main body 44, so that the head rest 4 supported by the head rest stays 4S can be vertically moved. Therefore, height of the head rest 4 can be adjusted for the body size of the passenger.

Figure 3:
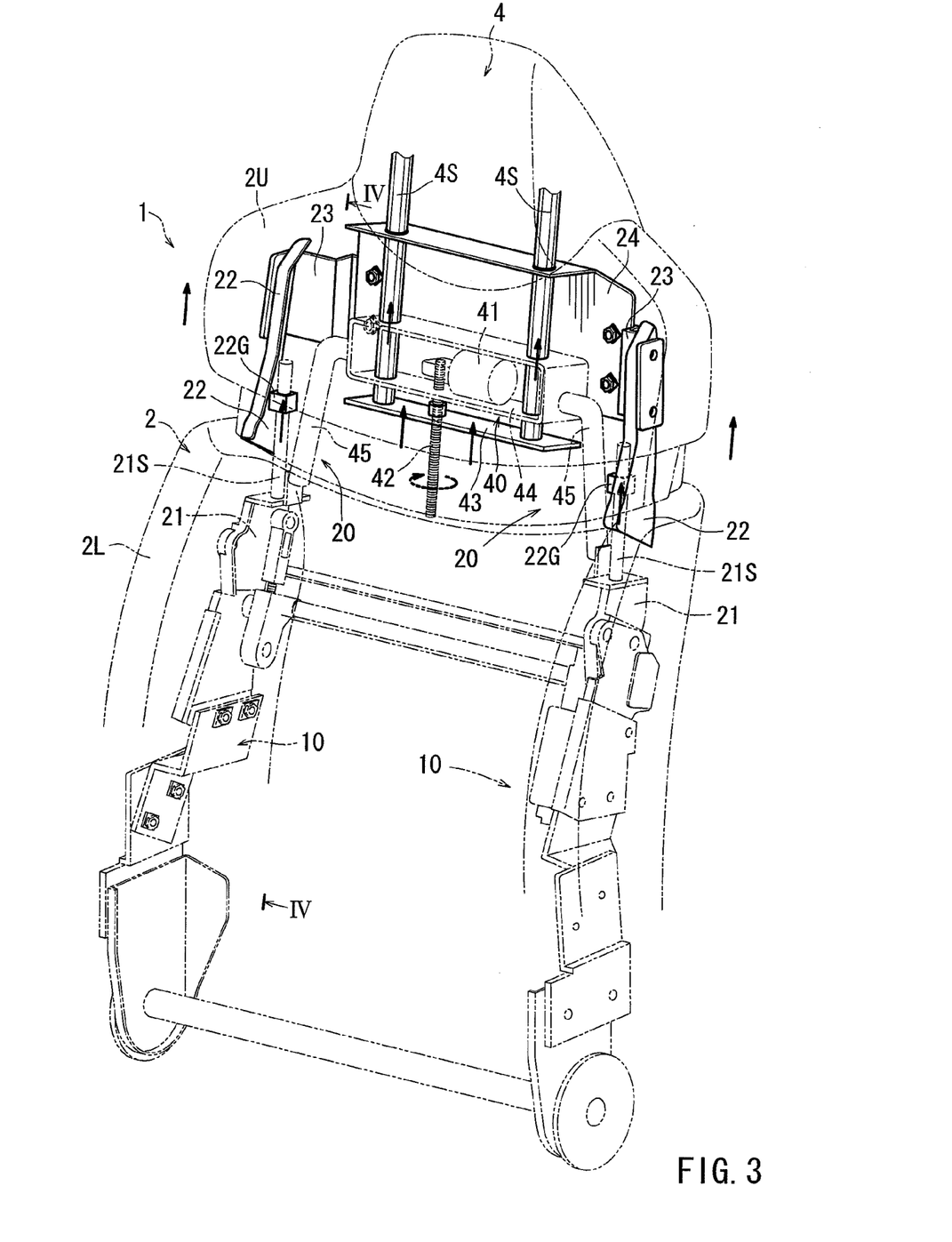
FIG. 3 is a perspective view similar to FIG. 2, which illustrates motion of the seat back upper half for extending a whole vertical length of the vehicle seat.

As best shown in FIG. 3, the head rest stays 4S are integrated with or welded to the reinforcement plate 24. Therefore, when the stay lifting base 43 is vertically moved along the screw rod 42, the reinforcement plate 24 integrated with the head rest stays 4S can be vertically moved relative to the main body 44 (i.e., relative to the rotatable plates 21). As a result, the liftable plates 22 that are integrated with the reinforcement plate 24 via the shouldered bracket plates 23 are vertically moved relative to the rotatable plate 21 along the guide rods 21S, so that the seat back upper half 2U can be vertically moved with the head rest 4 relative to the seat back lower half 2L. Therefore, the overall length of the seat back 2 can be adjusted for the body size of the passenger.

Thus, the upper half 2U is vertically moved with the head rest 4 relative to the lower half 2L, so that the overall length of the seat back 2 can be extended. However, in this structure, when the liftable plates 22 are vertically moved relative to the rotatable plates 21, the hinge connection (i.e., the connection of the rotatable plates 21 and the support plates 14 via the hinge pins 21a) is not vertically moved. Therefore, the upper half 2U can be vertically moved relative to the lower half 2L while vertically moving relative to the hinge connection (i.e., the intermediate folding position). That is, the overall length of the seat back 2 can be extended without raising the intermediate folding position thereof. Therefore, after the upper half 2U is moved upwardly in order to extend the overall length of the seat back 2, the upper half 2U can be tilted forwardly relative to the seat back lower half 2L in large radius of rotation about the hinge connection (the hinge pins 21a).

According to the vehicle seat 1 of the present embodiment, when the head rest 4 is vertically moved, the seat back upper half 2U can be simultaneously vertically moved with the head rest 4 relative to the seat back lower half 2L. That is, the head rest 4 and the seat back upper half 2U can be vertically moved as a unit. Thus, the seat back 2 can be preciously adjusted in order to fit the body size of the passenger.

Also, the vehicle seat 1 thus constructed does not need a special moving mechanism in order to move the seat back upper half 2U because the seat back upper half 2U can be vertically moved by the head rest height adjustment mechanism. Therefore, the vehicle seat 1 can be manufactured without increasing costs.

SECOND DETAILED REPRESENTATIVE EMBODIMENT

Figure 5:
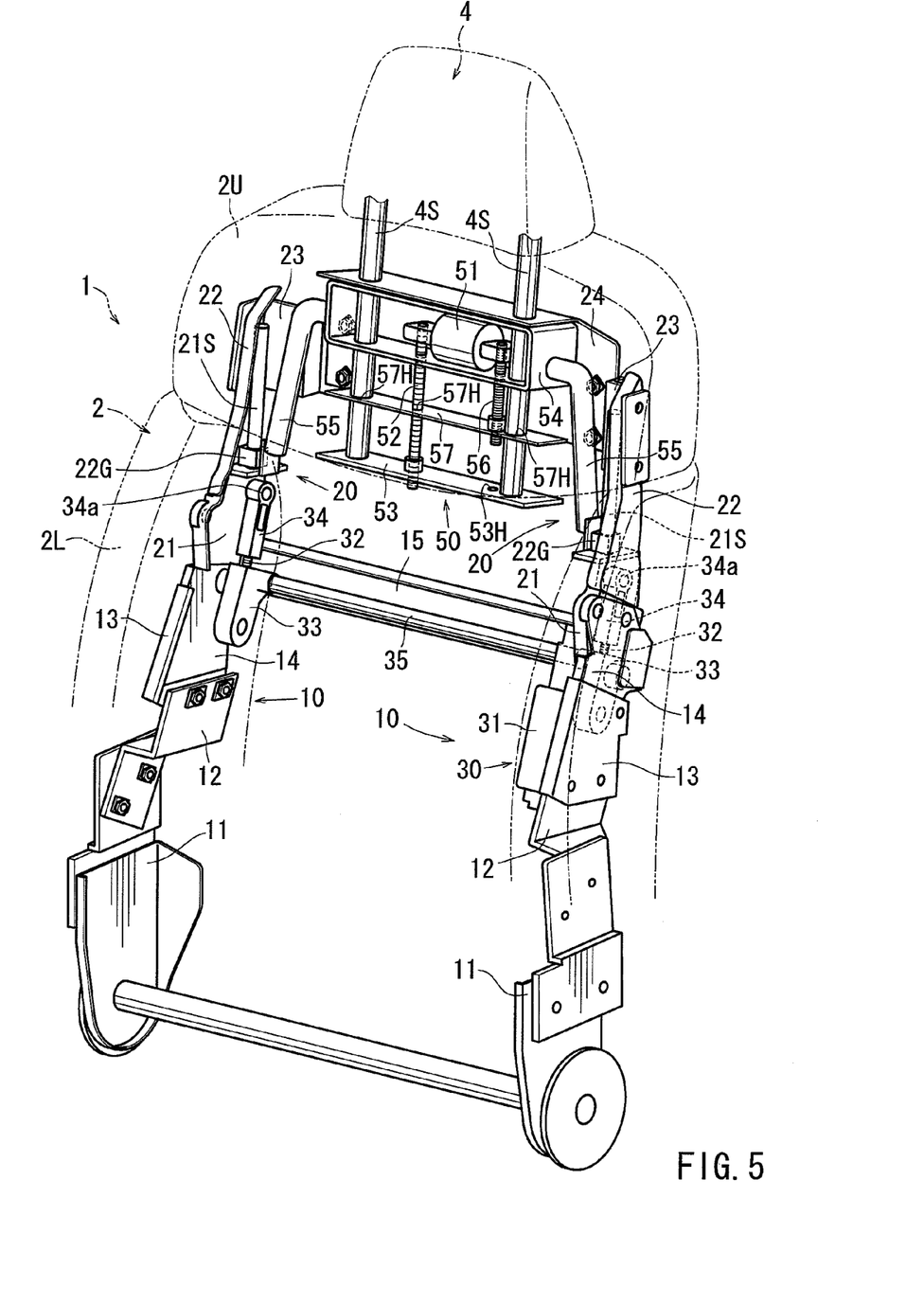
FIG. 5 is a perspective view of a vehicle seat according to a second representative embodiment of the present invention, which illustrates a framework or inner structure thereof.
Figure 6:
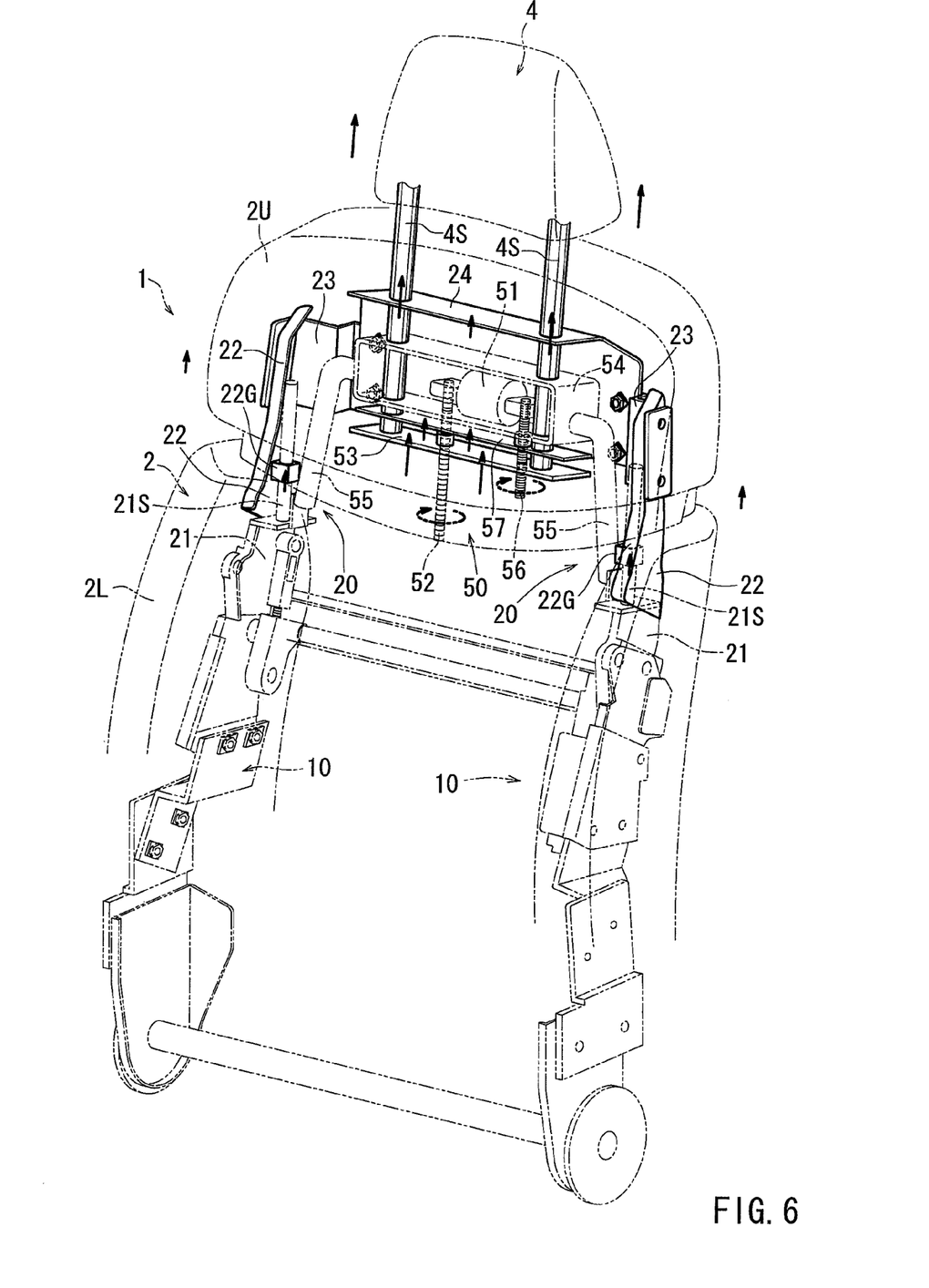
FIG. 6 is a perspective view similar to FIG. 5, which illustrates motion of an upper half of a seat back for extending a whole vertical length of the vehicle seat.

The second detailed representative embodiment will now described in detail with reference to FIGS. 5 and 6.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

In this embodiment, unlike the first embodiment, the head rest 4 is separately attached to the upper half 2U. Also, as shown in FIG. 5, a vertically moving device 50 is disposed in the upper half 2U in place of the vertically moving device 40 of the first embodiment. Similar to the vertically moving device 40, the vertically moving device 50 is arranged and constructed to vertically move the upper half 2U (the head rest 4) relative to the lower half 2L. However, unlike the vertically moving device 40, the vertically moving device 50 is arranged and constructed to vertically move the upper half 2U separately from the head rest 4.

The vertically moving device 50 is composed of a drive motor 51, a first screw rod 52, a second screw rod 56, a plate-shaped stay lifting base (a first lifting base; a movable component) 53, a plate-shaped liftable plate lifting base (a second lifting base; a movable component) 57, a frame-shaped main body 54 and a pair of support members 55.

Similar to the main body 44 of the first embodiment, the main body 54 is integrally fixedly connected to the rotatable plates 21 of the upper frame 20 via the support members 55. The drive motor 51 is disposed on the main body 54.

The first screw rod 52 is vertically positioned and is rotatably attached to the main body 54. An upper end of the first screw rod 52 is connected to the drive motor 51, so that the first screw rod 52 can be rotated when the drive motor 51 is actuated. The first screw rod 52 is extended downwardly and is threadably coupled to the stay lifting base 53 that is positioned below the main body 54. The stay lifting base 53 is connected to the head rest stays 4S. The head rest stays 4S are respectively vertically positioned and vertically slidably penetrate the main body 54. Therefore, the head rest stays 4S is capable of vertically moving relative to the main body 54.

Conversely, the second screw rod 56 is vertically positioned and is rotatably attached to the main body 54. An upper end of the second screw rod 56 is connected to the drive motor 51, so that the second screw rod 56 can be rotated when the drive motor 51 is actuated. The second screw rod 56 is extended downwardly and is threadably coupled to the liftable plate lifting base 57 that is substantially intermediately positioned between the main body 54 and the stay lifting base 53. The liftable plate lifting base 57 is connected to the reinforcement plate 24 that is integrated with the liftable plates 22 via the shouldered bracket plates 23.

Further, a screw pitch of the second screw rod 56 is determined to be smaller than (preferably, substantially half) a screw pitch of the first screw rod 52, so that the liftable plate lifting base 57 can vertically move at a speed slower than a speed of the stay lifting base 53. The reduced screw pitch of the second screw rod 56 constitutes a (speed) reduction mechanism. As will be appreciated, in this embodiment, the reduction mechanism may preferably have a speed reduction ratio of approximately one half (½).

In addition, the liftable plate lifting base 57 has three through holes 57H. The through holes 57H are respectively arranged and shaped so as to respectively vertically movably receive the head rest stays 4S and the first screw rod 52 therein. Therefore, the liftable plate lifting base 57 can vertically move without interfering with the head rest stays 4S and the first screw rod 52. Conversely, the stay lifting base 53 has a through holes 53H that is arranged and shaped so as to vertically movably receive the second screw rod 56 therein. Therefore, the stay lifting base 53 can vertically move without interfering with the second screw rod 56.

Upon actuation of the drive motor 51, the first screw rod 52 is rotated, so that the stay lifting base 53 is vertically moved along the first screw rod 52. At this time, the stay lifting base 53 is moved at a first predetermined speed corresponding to the screw pitch of the first screw rod 52. As a result, the head rest stays 4S can be vertically moved relative to the main body 54, so that the head rest 4 supported by the head rest stays 4S can be vertically moved relative to the main body 54 at the first speed.

However, in this embodiment, unlike the first embodiment, the head rest stays 4S are not integrated with or welded to the reinforcement plate 24, so as to vertically move relative to the reinforcement plate 24. Therefore, when the stay lifting base 53 is vertically moved along the first screw rod 52, the reinforcement plate 24 cannot be vertically moved relative to the main body 54 (i.e., relative to the rotatable plates 21). As a result, the liftable plates 22 are not vertically moved. Therefore, even if the stay lifting base 53 is vertically moved, the seat back upper half 2U cannot be vertically moved with the head rest relative to the seat back lower half 2L.

Conversely, upon actuation of the drive motor 51, the second screw rod 56 is rotated simultaneously with the first screw rod 52, so that the liftable plate lifting base 57 is vertically moved along the second screw rod 56. At this time, the liftable plate lifting base 57 is moved at a second predetermined speed corresponding to the screw pitch of the second screw rod 56 (i.e., at a speed substantially half the first speed of the stay lifting base 53). As a result, the liftable plates 22 that are connected to the liftable plate lifting base 57 via the reinforcement plate 24 can be vertically moved relative to the main body 54, so that the seat back upper half 2U can be vertically moved relative to the seat back lower half 2L at the second speed.

Thus, when the head rest 4 is vertically moved, the seat back upper half 2U can be simultaneously vertically moved relative to the seat back lower half 2L. However, unlike the first embodiment, the seat back upper half 2U can be vertically moved independently from the head rest 4.

According to the vehicle seat 1 of the second embodiment, the head rest 4 and the seat back upper half 2U can be simultaneously vertically moved. However, the head rest 4 and the seat back upper half 2U can be vertically moved separately from each other. That is, the seat back upper half 2U can be vertically moved relative to the seat back lower half 2L while the head rest 4 is vertically moved relative to the seat back upper half 2U. Therefore, the seat back 2 can be further precisely adjusted in order to fit the body size of the passenger. In particular, the seat back 2 can be precisely adjusted such that the head rest 4 and the seat back upper half 2U can respectively reliably fit the head portion and the shoulder portion of the passenger.

Also, the first and second screw rods 52 and 56 can be commonly driven by a single actuator (the drive motor 51). Therefore, the seat back 2 can be precisely adjusted without increasing manufacturing costs.

Naturally, various changes and modifications may be made to the present invention without departing from the scope of the invention. For example, in the embodiments, the angular adjustment mechanisms are provided to the seat back 2. However, the angular adjustment mechanisms can be omitted, if necessary.

Further, in the first embodiment, the seat back upper half 2U (the liftable plates 22 of the upper frame 20) is integrally connected to the head rest stay 4S that is connected to the stay lifting base 43. Conversely, in the second embodiment, the seat back upper half 2U is integrally connected to the liftable plate lifting base 57. However, the seat back upper half 2U can be combined with the other movable components of the head rest height adjustment mechanism.

Further, in the second embodiment, the speed reduction ratio of the reduction mechanism is determined to approximately one half (½). However, the speed reduction ratio of the reduction mechanism can be desirably changed.

The invention claimed is:

1. A vehicle seat having a seat back and a head rest, the seat back comprising:
    a seat back upper half corresponding to a shoulder portion of a passenger;
    a seat back lower half corresponding to a waist portion of the passenger,
    an angular adjustment mechanism disposed between the seat back upper half and the seat back lower half; and
    a head rest height adjustment mechanism, wherein the angular adjustment mechanism is configured to tilt the seat back upper half relative to the seat back lower half to an intermediate folding position, and wherein the seat back upper half is connected to at least one of a structural component of the head rest and a movable component of the head rest height adjustment mechanism, so as to be vertically movable relative to the seat back lower half while in the intermediate folding position when the head rest height adjustment mechanism is actuated.

2. The vehicle seat as defined in claim 1, wherein the head rest height adjustment mechanism is disposed in the seat back upper half, so as to vertically and movably support the structural component of the head rest, and wherein the seat back upper half is integrally connected to the structural component of the head rest, so as to be vertically movable with the head rest relative to the seat back lower half when the head rest height adjustment mechanism is actuated.

3. The vehicle seat as defined in claim 1, wherein the head rest height adjustment mechanism is disposed in the seat back upper half, so as to vertically and movably support the structural component of the head rest, wherein the seat back upper half is connected to the movable component of the head rest height adjustment mechanism via a reduction mechanism, so as to be vertically movable relative to the seat back lower half while the head rest is vertically movable relative to the seat back upper half when the head rest height adjustment mechanism is actuated.

4. The vehicle seat as defined in claim 3, wherein the head rest height adjustment mechanism comprises a first screw rod, a second screw rod, a first lifting base that is arranged and constructed to vertically move the head rest, and a second lifting base that is arranged and constructed to vertically move the seat back upper half, wherein the first and second screw rods are respectively threadably connected to the first and second lifting bases, and wherein the second screw rod is constructed so as to have a smaller screw pitch than the first screw rod, and forms the reduction mechanism.

* * * * *